US006475934B1

(12) United States Patent
Nonaka et al.

(10) Patent No.: US 6,475,934 B1
(45) Date of Patent: *Nov. 5, 2002

(54) WET CLOTH FOR CLEANING, WATER REPELLENT FINISH AND POLISHING OF AUTOMOBILE PAINT FILM

(75) Inventors: Jun-ichi Nonaka, Takarazuka; Ryutaro Hidaka, Higashiosaka, both of (JP)

(73) Assignee: Soft 99 Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/362,503

(22) Filed: Jul. 30, 1999

(30) Foreign Application Priority Data

Mar. 6, 1999 (JP) .......................................... 11-103055
Jun. 9, 1999 (JP) .......................................... 11-163099

(51) Int. Cl.$^7$ ................................................ B32B 27/04
(52) U.S. Cl. ............................ 442/60; 442/81; 442/82; 442/84; 442/90; 428/903
(58) Field of Search ............................ 442/79, 84, 90, 442/81, 82, 60; 428/903

(56) References Cited

U.S. PATENT DOCUMENTS

| | | | | |
|---|---|---|---|---|
| 3,433,667 A | | 3/1969 | Gergle et al. | 117/161 |
| 4,041,203 A | * | 8/1977 | Brock et al. | 428/903 |
| 4,683,001 A | | 7/1987 | Floyd et al. | 106/3 |
| 4,963,432 A | | 10/1990 | Fuggini et al. | |
| 6,309,984 B1 | * | 10/2001 | Nonaka et al. | 442/81 |

FOREIGN PATENT DOCUMENTS

| | | |
|---|---|---|
| EP | 0392316 A1 | 10/1990 |
| JP | 02175355 A | 7/1990 |
| JP | 02202971 A | 8/1990 |
| JP | 02280731 A | 11/1990 |
| JP | 04-033686 | 3/1992 |
| JP | 05004563 A | 1/1993 |
| JP | 05-015481 | 1/1993 |
| JP | 05-093350 | 4/1993 |
| JP | 05130963 A | 5/1993 |
| JP | 05293070 A | 11/1993 |
| JP | 06-101148 | 4/1994 |
| JP | 10024001 A | 1/1998 |
| JP | 11-152462 | 6/1999 |
| WO | WO 98/12958 | 4/1998 |

OTHER PUBLICATIONS

European Search Report dated Aug. 2, 2001.

* cited by examiner

*Primary Examiner*—Elizabeth M. Cole
(74) *Attorney, Agent, or Firm*—Armstrong, Westerman & Hattori, LLP

(57) ABSTRACT

An excellent wet cloth with which, only by wiping the body, not only can stains and dirt attached to an automobile body be removed therefrom, but a glossy film with water repellency can also be formed. The cloth, woven or non-woven, is made from lipophilic fibers and hydrophilic fibers in a content ratio of 80:20 to 50:50 and is impregnated with a wet cloth treating agent which is prepared by dispersing a silicone compound such as dimethylpolysiloxane, trimethyl siloxy silicate or the like; a fluorine compound such as perfluoroalkylpolyether or the like; or a waxy substance such as carnauba wax, candelilla wax or the like in water together with a surfactant, thereby obtaining a wet cloth for cleaning, providing a water repellent finish and polishing of an automobile paint film.

16 Claims, No Drawings

WET CLOTH FOR CLEANING, WATER REPELLENT FINISH AND POLISHING OF AUTOMOBILE PAINT FILM

BACKGROUND OF THE INVENTION

1. Field of the Invention

The present invention relates to a wet cloth for cleaning, water repellent finish and polishing of an automobile paint film. Particularly, the present invention relates to a wet cloth for cleaning, water repellent finish and polishing of an automobile paint film with which a stain or dirt attaching to the automobile paint film can be removed and at the same time, water repellency and glossiness are given to the paint film, only by wiping the body of an automobile.

2. Description of the Prior Art

While it has been general that an automobile body is frequently cleaned in order to keep the body beautiful and treated with a film forming agent such as wax or the like in order to prevent a stain or dirt from fixedly adhering to the surface thereof, not only do washing and a water repellent, glossy film forming treatment consume lots of water, labor and time, but influences of the cleaning and the like on the environment (a waste water treatment of used water in car washing and the like) have to be seriously considered.

Besides, when no parking lot is available near a home due to the recent housing problem, a car washing machine at a car cleaning station, a gas station or the like has to be utilized, which unfavorably not only consumes much of time and labor but also becomes monetary burden.

Besides, as methods for forming a glossy film with water repellency, there has been employed a conventional method using a car wax, which comprises a series of steps of: sufficiently swabbing water left on the body of an automobile after washing; applying a wax thereon; vaporizing a solvent; wiping away the wax therefrom and the like, which has been resulted in causing a problem that not only the series of steps take considerable time for performing, but wiping of wax feels heavy and the wax is hard to be successfully removed. Hence, a method whereby an automobile can be taken care of with ease and simplicity has seriously been desired to be available.

SUMMARY OF THE INVENTION

The present invention has been made in light of the state of the above mentioned conventional technique in order to eliminate an operation of car washing in cleaning an automobile body and forming a glossy film with water repellency and solve weak points such as poor time efficiency in formation of a glossy film with water repellency and poor workability in wax wiping. That is, it is accordingly an object of the present invention is to provide an excellent wet cloth which can not only remove a stain and dirt attaching to an automobile body, but can also simultaneously form a glossy film with water repellency, only by wiping the body.

A wet cloth for cleaning, water repellent finish and polishing according to the present invention is a cloth which is impregnated with a liquid which is prepared by dispersing a water repellent component in water using an emulsifier. As a water repellent component used in the present invention, one or more selected from the group consisting of a silicone compound, a fluorine compound, a wax and a waxy substance can be used and further, as an emulsifier, a surfactant can preferably be used.

As cloths, a non-woven cloth is preferably used.

In the present invention, as a cloth, a cloth is preferably used which contains lipophilic fibers and hydrophilic fibers in ratio of content preferably ranged from 80:20 to 50:50 by weight.

In the present invention, an effect of the present invention can be further exerted by use of a cloth which has a three layer structure which is obtained by arranging lipophilic fiber layers made of lipophilic fibers on both sides of a hydrophilic fiber layer made of hydrophilic fibers.

As the cloth mentioned above, a cloth can be used which is made using yarns spun from natural fibers and synthetic fibers singly or in mixture.

A cloth made by yarns spun from ultra, super fine fibers of less than 0.3 denier each is especially preferred to be used.

DETAILED DESCRIPTION OF THE INVENTION

A wet cloth for cleaning, water repellent finish and polishing according to the present invention is obtained by impregnating a cloth with a wet cloth treating agent which is prepared by dispersing a water repellent component in water using an emulsifier and, by wiping the surface of an automobile paint film directly with the wet cloth, not only are a stain and dirt removed from the surface of the automobile paint film but a water repellent film is also formed on the paint film surface.

As water repellent components used in a wet cloth for cleaning, water repellent finish and polishing, there can be named: a silicone compound, a fluorine compound, a wax, a waxy substance and the like, which have all conventionally been used as a water-repellent, polishing agent.

A silicone compound is preferably used since the compound well satisfies all the requirements such as water repellency, a fixedly adhering property, general versatility and the like. As such silicone compounds, there can be named, for example, an organo-polysiloxane and preferably, a dimethylpolysiloxane among organo-polysiloxanes.

Further, a modified dimethylpolysiloxane which is obtained by modifying part of dimethylpolysiloxane with an organic functional group can be used. Modified dimethylpolysiloxanes can at least improve glossiness, give dirt preventiveness and/or improve a fixedly adhering property by an introduced organic functional group. As modified dimethylpolysiloxanes, there can be named: for example, amino-modified dimethylpolysiloxane, alkyl-modified dimethylpolysiloxane, alkylaralkyl-modified dimethylpolysiloxane, fluorine-modified dimethylpolysiloxane, epoxy-modified dimethylpolysiloxane, alkoxy-modified dimethylpolysiloxane, carboxyl-modified dimethylpolysiloxane, methacryloxy-modified dimethylpolysiloxane, ester-modified dimethylpolysiloxane, amid-modified dimethylpolysiloxane, polyether-modified dimethylpolysiloxane, alcohol-modified dimethylpolysiloxane, phenol-modified dimethylpolysiloxane, methylphenyl-modified dimethylpolysiloxane, methylhydrogen-modified dimethylpolysiloxane, mercapto-modified dimethylpolysiloxane and the like.

Among them, amino-modified dimethylpolysiloxane, carboxyl-modified dimethylpolysiloxane, alkoxy-modified dimethylpolysiloxane, ester-modified dimethylpolysiloxane and the like, all of which have polar groups respectively, have a good fixedly adhering property to a paint film and when they are each used in combination with the dimethylsiloxane, a film with sustainable water repellency can be formed by a synergetic effect therebetween.

Besides, in addition to the above described, a liquid can be used which is prepared by dissolving a trimethyl siloxi silicate expressed by a general formula (formula 1)

described below in a non-volatile oily component. As such non-volatile oily components, there can be named: a dimethylpolysiloxane and a modified form thereof, and various kinds of mineral oils. Such a solution of a trimethyl siloxi silicate is remained on the surfaces of fibers without hardening in impregnation of a cloth with the solution and can also migrate to the surface of a paint film from the impregnated cloth in a proper manner to form a uniform water repellent film on the surface of the paint film while adhering thereto. On top of this, thus obtained water repellent film is excellent in the sustainability.

$$[(CH_3)_3SiO_{1/2}]X\cdot[SiO_2]Y \quad \text{(formula 1)}$$

wherein the formula 1, X=1 to 3 and Y=0.5 to 8.

Then, in the present invention, a liquid fluorine compound with water repellency can be used. As such fluorine compounds, there can be named: for example, low grade polymers such as a perfluoroalkylpolyether, tetrafluoroethylene and trifluoroethylene. Further, there can be named various kinds of derivatives such as perfluoroalkylethers which are respectively terminated with functional groups such as a hydroxyl group, a carboxyl group, an isocyanate group and the like. These compounds are very stable thermally and chemically and show a good lubricating ability over a wide temperature range. Accordingly, by use of such fluorine compounds, a film which shows good water repellency regardless of use conditions can be formed.

In addition, as water repellent components in the present invention, there can be named natural or synthetic wax and waxy substance which have conventionally been used as a polishing agent. For example, there can be named: carnauba wax, candelilla wax, rice wax, japan tallow, beeswax, spermaceti, lanolin and a derivative thereof, hardened castor oil, a fatty acid and a derivative thereof, paraffin wax and a derivative thereof, ozokerite, ceresin, microcrystalline wax, polyethylene wax and a derivative thereof, Fischer-Tropsch wax, polypropylene wax, and montan wax and a derivative thereof. Among them, paraffin wax, polyethylene wax, polypropylene wax, microcrystalline wax and the like, which are hydrocarbon based waxes respectively, are especially preferable because of their excellent water repellency.

The various kinds of water repellent components which are described above may be used singly or preferably in combination of two or more kinds: if possible, combinations such as a wax or a waxy substance and a silicone compound; a wax or a waxy substance and a fluorine compound; and a silicone compound and a fluorine compound.

In this case, commercial products can be used which are produced by mixing two or more kinds of the water repellent components in advance or emulsification thereof using a surfactant: for example, a solution which is obtained by dissolving the trimethyl siloxi silicate in a liquid dimethylpolysiloxane or a liquid cyclic silicone, a product which is obtained by emulsification of the solution in water using an emulsifier, and a product which is obtained by emulsification of amino-modified dimethylpolysiloxane, perfluoroalkylpolyether or the like in water using an emulsifier.

The water repellent components are used in a dispersed condition in water together with an emulsifier as a wet cloth treating agent in the form of an emulsion. As emulsifiers used in the present invention, there is no specific limitation, but various kinds of surfactants can be named. As surfactants, any of anionic, cationic, nonionic and amphoteric surfactants may be used: for example, as anionic surfactants, fatty acid salt, alkylbenzene sulfonate, and the like; as cationic surfactants, quaternary ammonium salt and the like; as nonionic surfactants, polyoxyethylenealkylether, polyoxyethyleneallylether, sorbitan fatty acid ester, polyoxyethylene sorbitan fatty acid ester, polyoxyethylene sorbitol fatty acid ester and the like.

The emulsifiers each may be contained in a ratio in the range of 0.1 to 10 parts by weight, or preferably 0.2 to 5 parts by weight in 100 parts of a treating agent (liquid). If an emulsifier is contained less than 0.1 part by weight, a water repellent component cannot sufficiently be emulsified, but an resultant treating agent is poor in stability and separated and also, degraded in impregnating ability to a cloth. On the other hand, if an emulsifier is contained in excess of 10 parts by weight, there arises no problem in emulsification, but a fixedly adhering ability to a paint film is degraded and thereby, a water repellent film is easy to be washed away, which unfavorably deteriorates its sustainability of water repellency. In the mean time, as products in which a water repellent component emulsified in water by an emulsifying agent is contained, commercial products for industrial or cosmetic applications in a general sense may be employed and if such commercial products are adopted, a treating liquid can be very efficiently prepared only by mixing them into water without any sufficient facility for emulsification. In this case, it is necessary that an additive quantity of an emulsifier is carefully controlled and a fixedly adhering ability to a paint film is prevented from being deteriorated.

A wet cloth for cleaning, water repellent finish and polishing according to the present invention is prepared by immersing a cloth into a cloth treating agent described above which can be obtained by dispersing a water repellent component in water with the help of an emulsifier. At this point, an additive amount of the water repellent component is adjusted in the range of 0.1 to 10% by weight, or preferably 0.5 to 5% by weight in the cloth treating agent (liquid). If a water repellent component is added less than 0.1% by weight, sufficient water repellency is not given to a paint film, while if it is added beyond 10% by weight, the water repellent component is excessively applied on the paint film and thereby, non-uniformity of water repellency is resulted over the paint film with ease.

While a wet cloth treating agent which is an emulsion is obtained using the emulsifiers and the water repellent components according an ordinary method, the wet cloth treating agent is generally added with a polishing agent and in addition, other components such as a cleaning assistant, an ultraviolet absorber, a rust preventive, an antiseptic agent, a perfume, a coloring agent and the like may also be added without any problem depending on a necessity.

A wet cloth for cleaning, water repellent finish and polishing according to the present invention is obtained by immersing a cloth into a wet cloth treating agent. As a method for the immersion, a generally known processing method which has been used in industrial production can be employed. For example, after a cloth is prepared by cutting a larger cloth into pieces each with a target size, thus obtained cloth piece is folded into a stacked structure and a wet cloth treating agent is applied on the folded cloth piece by a various method such as a shower method in which the agent is poured on the cloth piece from thereabove, a roll coater method and a dipping method, to name a few.

In the present invention, the surface of a paint film of an automobile is wiped with a cloth which is impregnated with a wet cloth treating agent thus obtained, so that:

1. a cloth treating agent impregnated into the cloth is oozed out from the interior of the cloth and mud or dust attaching to the paint film surface is wet. Simultaneously with such a change, the paint film surface is wiped with the cloth and thereby, wet mud or wet dust is removed by rubbing with the cloth. Further, a water repellent component which is oozed out from the cloth together with water adheres onto the paint film, being separated from the water and the water repellent film is thereby formed on the paint film surface;

2. water left behind which is repelled by the water repellent film thus formed is again absorbed into the cloth; and
3. the absorbed water dilutes the treating agent included in the cloth and thereby, the water repellent component is oozed out from the interior of the cloth with ease.

In such a manner, a water repellent film is formed on the surface of a paint film of an automobile.

Therefore, while, as a cloth which can be employed, there is no specific limitation thereto as far as the above mentioned functions are exerted, a cloth in which lipophilic fibers are used is desired in that not only can a water repellent component be retained to some extent, but the water repellent component impregnated is trickled out in a small amount, so that the water repellent component can be applied on the paint film surface of the automobile without any non-uniformity. On the other hand, in a case where a cloth which is made of lipophilic fiber singly, a water absorbance and a water holding property of a cloth treating agents are deteriorated, which makes a dry state and a water repellent agent retaining state come fast after the start in application. As a result, a water repellent film is not sufficiently formed and a stain or dirt attaching on the paint film surface cannot be removed. Further, there is a chance where residual water left behind which is repelled by the water repellent film is not sufficiently absorbed again. For this reason, it is preferable to use a cloth which is obtained using mixed-spun yarns from lipophilic fibers and hydrophilic fibers, and especially to use a cloth in which more of lipophilic fibers are used. At this point, when a content ratio between lipophilic fibers and hydrophilic fibers in use is in the range 80:20 to 50:50 by weight, the above described functions can be exerted most effectively. If a ratio of hydrophilic fibers is more than the upper limit, a cloth cannot retain a sufficient amount of a water repellent component therein and the water repellent component retained therein goes out at once, which is resulted in non-uniformity of the water repellent film. On the other hand, if a ratio of lipophilic fibers is more than the upper limit, while the water repellent component can sufficiently be retained in the cloth, the water repellent component is hard to be chased out because water is not absorbed, thereby making it impossible to form a water repellent film all over the surface of the body of an automobile.

That is, when a cloth which is made of more of lipophilic fibers is used, there arise risks that since the cloth is fast dried, mud and the like on the automobile cannot sufficiently be wet in the course of wiping out the whole body thereof, which makes it impossible to perfectly remove a stain or dirt, and further, the water repellent component is not supplied from the cloth and therefore, a water repellent film is not formed. On the other hand, when a cloth which is made of more of hydrophilic fibers, while immediate drying is prevented from occurring, a water repellent component goes out at once, a water repellent film is thick and not uniform at the beginning stage of wiping and even when the whole body of an automobile is wiped out, there is a chance where an effective water repellent film cannot be formed somewhere in the last stage of wiping since any of the water repellent component is not left. For this reason, in any way, there is a risk which causes a problem that even when a large cloth is used, a water repellent film can not sufficiently be formed over the whole body of an automobile and waste of the cloth treating agent is unavoidable, and thereby, there arises a case where many wet cloths are required for the wiping.

Therefore, a ratio in content between lipophilic fibers and hydrophilic fibers is set in the above described ranges. Thereby, fast drying of a wet cloth and non-uniformity of a film in the course of application of a cloth are prevented from occurring and there can be provided a wet cloth, with one piece of which the whole body of an automobile can be sufficiently wiped out, and therefore, which is high in cost performance.

As materials for lipophilic fibers and hydrophilic fibers which are used in a wet cloth, there is no specific limitation thereto and there can be named: natural fibers such as cotton, silk, linen, wool, pulp and the like; synthetic fibers such as polyester, polypropylene, polyethylene, polyacrylonitrile, Nylon, Vinylon, polyvinyl chloride, polyurethane, rayon and the like. Among them, as lipophilic fibers, olefin synthetic fibers such as polypropylene, polyester and the like; and as hydrophilic fibers, natural fibers such as cotton, pulp and the like, and rayon are preferably employed. Incidentally, the term hydrophilic fibers used in the present invention means the fibers with an official regain of 5 or more and the term lipophilic fibers used in the present invention means the fibers with an official regain of less than 5. However, as for hydrophilic fibers, to use hydrophilic fibers with a larger official regain is preferable in that a content ratio of lipophilic fibers can be increased.

Further, it is preferable that ultra, super fine fibers of less than 0.3 denier in thickness is singly used or a combination thereof with normal fibers is used. Thereby, water can well be absorbed or a stain or dirt can be removed with ease and besides, polishing damages are hard to occur on a paint film surface to be wiped.

Such a cloth may be any of a woven cloth, a non-woven cloth and a knit and any cloth which can constitute a base for a so-called chemical swabbing cloth can be used without any specific limitation. Among them, a non-woven cloth, or especially a non-woven cloth which is made of hydrophilic fibers and lipophilic fibers in the above described ranges in the form of mixed-spun yarns is preferred to be used from the viewpoint of general versatility and cost.

Further, in an embodiment of the present invention, a cloth which has a three layer structure which is obtained by arranging lipophilic fiber layers made of only lipophilic fibers on both sides of a hydrophilic fiber layer made of only hydrophilic fibers is preferably used. In this case, as well, a ratio in content between hydrophilic fibers and lipophilic fibers is set in the above described ranges. That is, with the three layer structure, not only a water repellent component is gradually oozed out from the interior of the lipophilic fiber layers arranged in the outer layers, but water is supplied into the lipophilic fiber layers of the outer layers from the hydrophilic fiber layer arranged in the inner layer, thus preventing the lipophilic fiber layer from being dried. Needless to say that in this case, too, the lipophilic fiber layers of the outer layers may be made with yarns in which a small amount of hydrophilic fibers mixed.

A wet cloth according to the present invention comes to a state in which the cloth is not able to be used when the cloth in the wet condition is left outside for a long time in order to be used being exposed to the air since water is vaporized away from the cloth. For this reason, a container which prevents water in a cloth from being vaporized, such as a container for wet tissue generally on the market is employed in order to provide wet cloths. For example, wet cloths are provided being put in a plastic container or in a pillow package (a package form in which a packing film constructed from a resin film such as made of polyethylene, polyester or the like, and an aluminum foil or an aluminum-deposited film is used to form a bag by hot-melting). A wet cloth according to the present invention which is taken out from such a package is applied, for wiping in a state thereof as it is taken out, to an automobile body without any pretreatment on the body and thereby, in one time wiping operation, not only is the surface of a paint film of an automobile cleaned and simultaneously provided with water repellency, but polishing can also be performed.

EXAMPLES

The present invention will be further described based on wet cloths for cleaning, water repellent finish and polishing of a paint film of an automobile which are examples of the present invention. In the mean time, it is needless to say that the present invention is not limited to the examples. Further, chemicals which were used will be described.

(1) Water repellent component

A dimethylpolysiloxane solution of trimethyl siloxi silicate (VP-1038) made by Wackerchemicals East Asia Ltd. which is prepared by dissolving trimethyl siloxi silicate with a viscosity of 2000 cst (25° C.) and a concentration of 30.0 wt % in a dimethylpolysiloxane with a viscosity of 350 cst.

An emulsion of a dimethylpolysiloxane solution of trimethyl siloxi silicate (R-2701) made by Wackerchemicals East Asia Ltd. which is prepared by emulsifying in water with a nonionic surfactant a solution obtained by dissolving trimethyl siloxi silicate with a viscosity of 2000 cst (25° C.) and a concentration of 40.0 wt % in a dimethylpolysiloxane with a viscosity of 350 cst.

An emulsion of a cyclic silicone solution of trimethyl siloxi silicate (X-52-1451) made by Shin-Etsu Chemical Co., Ltd. which is prepared by emulsifying in water with a nonionic surfactant a solution obtained by dissolving trimethyl siloxi silicate with a concentration of 50.0 wt % in a cyclic silicone.

Dimethylsilicone oil (KF96-10) made by Shin-Etsu Chemical Co., Ltd. with a viscosity of 10 cst and a specific gravity of 0.935 (25° C.).

A dimethylsilicone oil emulsion (SH7036) made by Toray Dowcorning Silicone which is prepared by emulsifying in water with a nonionic surfactant dimethylsilicone oil with a concentration of 38.0 wt % and a viscosity of 350 cst.

Amino-modified dimethylpolysiloxane (KF-859) made by Shin-Etsu Chemical Co., Ltd. which is prepared by coupling an amino group with a side chain of dimethylpolysiloxane with a viscosity of 60 cst.

An emulsion of amino-modified dimethylpolysiloxane (POLON MF-14EC) made by Shin-Etsu Chemical Co., Ltd. which is prepared by emulsifying in water with a nonionic surfactant amino-modified silicone oil with a concentration of 34 wt %.

A paraffin wax emulsion (Emustar 0136) made by Nippon Seiro Co., Ltd. which is prepared by emulsifying in water with a nonionic surfactant paraffin wax with a concentration of 34.0 wt % and a melting point of 55° C.

An emulsion of perfluoroalkylpolyether (Fomblin emulsion) made by Audimont Co. which is prepared by emulsifying in water with a nonionic surfactant perfluoroalkylpolyether with a concentration of 30.0 wt %.

(2) Surfactant

Polyoxyethylene stearylether (Emulgen 106) made by Kao Corporation with an HLB of 10.5.

[Evaluation Test 1]

Wet cloths of Examples 1 to 6 which will be described below were used to perform the following evaluations on workability, a dirt removing ability, a water repellency giving ability and glossiness and results were compiled in Table 1.

(Workability)

A black color painted car of a 1996 type (Nissan Cedric) was provided in a test and a time required for formation of a water repellent film was measured. The time was measured from when car washing gets started till the water repellent film was formed. Incidentally, in examples, car washing was not applied and the time is only a time required for fully wiping the whole car body using a wet cloth, while in comparative examples, the time is from car washing through swabbing water droplets after the car washing, application of wax and drying till wiping away of the wax.

(Dirt Removing Ability)

A test surface was prepared in such a manner that a black color painted car of a 1996 type (Nissan Cedric) was provided in a test, the bonnet of a car was applied with wax to remove a stain or dirt, a filmy portion of the wax left on the surface is removed with an aliphatic solvent and then the car was left outdoors for 2 weeks. After the test surface was divided into 10 segments (one segment was about 30×60 square cm), 6 segments thereof were applied with a wet cloth to wipe away dirt and thereby, form a water repellent film.

Products which were adopted in comparative examples were used according to usage instructions stipulated for each product. At this point, only one segment was left without any treatment thereon as a blank test. A removing ability was investigated about dust and sand deposited on each paint film surface to evaluate with 4 levels comprising very good [◎], good [○], average [Δ] and bad [X].

(Water Repellency Giving Ability)

The treated surfaces obtained after the dirt removing ability test were subjected to the following tests:

i) Water repellency immediately after the treatment

Water was poured on each test surface, and shapes of water droplets and a degree of repellency acting on the water droplets were visually observed, wherein evaluation was conducted with 4 levels comprising a droplet with a well swollen spherical surface and a good water repellency [◎], a droplet with a deformed spherical surface, though a water repellency is observed [○], a slightly weak water repellency [Δ] and almost no water repellency [X].

ii) Glossiness immediately after the treatment

Each test surface was visually judged to evaluate with 4 levels comprising very good [◎], good [○], average [Δ] and bad [X].

iii) Sustainability of water repellency

Sustainability of water repellency of each test surface was evaluated in such a manner that water washing was applied after one month was elapsed the treatment, then water was poured on each test surface to judge shapes of water droplets formed on each test surface and a degree of repellency acting on the water droplets through visual observation with 4 levels comprising a droplet with a well swollen spherical surface and a good water repellency [◎], a droplet with a deformed spherical surface, though a good water repellency is observed [○], a slightly weak water repellency[Δ] and almost no water repellency [X].

Example 1

| components | compositions (wt %) |
|---|---|
| dimethylpolysiloxane solution of trimethyl siloxi silicate (VP-1038) | 2.5 |
| dimethylsilicone oil (KF96-10) | 1.0 |
| amino-modified dimethylsiloxane (KF-859) | 2.0 |
| polyoxyethylene stearylether (Emulgen 106) | 0.5 |
| water | 4.0 |
| Total | 100.0 |

After the surfactant was dissolved in water, the dimethylpolysiloxane solution of trimethyl siloxi silicate, dimethylsilicone oil and amino-modified dimethylsiloxane were added to the solution of the surfactant while stirring to form an emulsion as a wet cloth treatment agent. The wet cloth treating agent (20 g) was impregnated into a spun lace non-woven cloth cut in size of 30 cm×50 cm (a weight of about 12 g) with a fabric weight of 70 g/m$^2$ made using mixed-spun yarns from ultra, super fine fibers of polypropylene and polyester and thereafter, thus obtained wet cloth was packed in a pillow package with a laminated film composed of a polyethylene film and an aluminum foil.

Example 2

| components | compositions (wt %) |
|---|---|
| emulsion of a dimethylpolysiloxane solution of trimethyl siloxi silicate (R-2701) | 8.0 |
| dimethylsilicone oil emulsion (SH7036) | 2.0 |
| polyoxyethylene stearylether (Emulgen 106) | 0.1 |
| water | 89.9 |
| Total | 100.0 |

The emulsion of a dimethylpolysiloxane solution of trimethyl siloxy silicate, the dimethylsilicone oil emulsion and the surfactant were mixed and thereafter, water was mixed into the solution to obtain a wet cloth treating agent. The wet cloth treating agent (20 g) was impregnated into a spun lace non-woven cloth cut in size of 30 cm×50 cm (a weight of about 12 g) with a fabric weight of 70 g/m$^2$ made using mixed-spun yarns from ultra, super fine fibers of polypropylene and polyester and thereafter, thus obtained wet cloth was packed in a pillow package with a laminated film composed of a polyethylene film and an aluminum foil.

Example 3

| components | compositions (wt %) |
|---|---|
| paraffin wax emulsion (Emustar 0136) | 5.0 |
| dimethylsilicone oil emulsion (SH7036) | 5.0 |
| water | 90.0 |
| Total | 100.0 |

The paraffin wax emulsion and the dimethylsilicone oil emulsion were mixed and thereafter, water was added into the solution and the solution was stirred to obtain a wet cloth treatment agent. The wet cloth treating agent (20 g) was impregnated into a spun lace non-woven cloth cut in size of 30 cm×50 cm (a weight of about 12 g) with a fabric weight of 70 g/m$^2$ made using mixed-spun yarns from fibers of cotton and polyester and thereafter, thus obtained wet cloth was packed in a pillow package with a laminated film composed of a polyethylene film and an aluminum foil.

Example 4

| components | compositions (wt %) |
|---|---|
| emulsion of perfluoroalkylpolyether (Fomblin emulsion) | 10.0 |
| polyoxyethylene stearylether (Emulgen 106) | 0.1 |
| water | 89.9 |
| Total | 100.0 |

The emulsion of perfluoroalkylpolyether and the surfactant were mixed, thereafter, water was added into the solution and then the solution was stirred to obtain a wet cloth treatment agent. The wet cloth treating agent (20 g) was impregnated into a spun lace non-woven cloth cut in size of 30 cm×50 cm (a weight of about 12 g) with a fabric weight of 70 g/m$^2$ made using mixed-spun yarns from ultra, super fine fibers of polypropylene and polyester and thereafter, thus obtained wet cloth was packed in a pillow package with a laminated film composed of a polyethylene film and an aluminum foil.

Example 5

| components | compositions (wt %) |
|---|---|
| emulsion of a dimethylpolysiloxane solution of trimethyl siloxi silicate (R-2701) | 5.0 |
| emulsion of a cyclic silicone solution of trimethyl siloxi silicate (X-52-1451) | 3.0 |
| emulsion of amino-modified dimethylsiloxane (POLON MF-14EC) | 2.0 |
| water | 90.0 |
| Total | 100.0 |

The two kinds of solution emulsions of trimethyl siloxi silicate and the emulsion of amino-modified dimethylsiloxane were mixed, thereafter, water was added into the solution and the solution was then stirred to obtain a wet cloth treatment agent. The wet cloth treating agent (20 g) was impregnated into a spun lace non-woven cloth cut in size of 30 cm×50 cm (a weight mixing ratio of 30% of pulp, 35% of polyethylene and 35% of polyester and a weight of about 12 g) with a fabric weight of 70 g/m$^2$, having a three layer structure comprising a central layer made of pulp and both outer layers made using mixed-spun yarns from ultra, super fine fibers of polyethylene and polyester and thereafter, thus obtained wet cloth was packed in a pillow package with a laminated film composed of a polyethylene film and an aluminum foil.

Example 6

| components | compositions (wt %) |
|---|---|
| emulsion of a dimethylpolysiloxane solution of trimethyl siloxi silicate (R-2701) | 2.0 |
| emulsion of a cyclic silicone solution of trimethyl siloxi silicate (X-52-1451) | 1.0 |
| paraffin wax emulsion (Emustar 0136) | 2.0 |
| dimethylsilicone oil emulsion (SH7036) | 5.0 |
| water | 90.0 |
| Total | 100.0 |

The two kinds of solution emulsions of trimethyl siloxi silicate, the paraffin wax emulsion and the dimethylsilicone oil emulsion were mixed, thereafter, water was added into the solution and the solution was then stirred to obtain a wet cloth treatment agent. The wet cloth treating agent (20 g) was impregnated into a spun lace non-woven cloth cut in size of 30 cm×50 cm (a weight mixing ratio of 30% of cotton, 35% of polypropylene and 35% of polyester and a weight of about 12 g) with a fabric weight of 70 g/$m^2$, having a three layer structure comprising a central layer made of cotton and both outer layers made using mixed-spun yarns from ultra, super fine fibers of polypropylene and polyester and thereafter, thus obtained wet cloth was packed in a pillow package with a laminated film composed of a polyethylene film and an aluminum foil.

Comparative Example 1

Commercial Solid Wax Made of Carnauba Wax as Main Component

Carnauba wax, a silicone oil, oleic acid and the like were added into mineral sprit and the mixture was heated up to 90° C. to dissolve them. Thereafter, the solution was poured in a vessel and then naturally cooled to form a solid.

Comparative Example 2

Commercial Paste Wax Made of Montan Wax as a Main Component

Montan wax, a silicone oil, oleic acid and the like were added into mineral sprit and the mixture was heated up to 90° C. to dissolve them. Thereafter, the solution was subjected to saponification by morpholine and added with hot water, and the solution was stirred to emulsify in uniform manner. The emulsion was poured into a vessel to naturally cool to be hardened into a paste.

Comparative Example 3

Commercial Solid Wax made of Polyethylene Wax as Main Component

Polyethylene wax, a silicone oil and the like were added into mineral sprit and the mixture was heated up to 100° C. to dissolve them. Thereafter, the solution was poured in a vessel and then naturally cooled to form a solid.

[Evaluation Test 2]

Wet cloths of Examples 7 to 11 which will be described below was used and the following evaluation tests were performed on dirt removing ability, water repellency giving ability and glossiness to evaluate cloths in terms of a mixed-spinning ratio applied. Results were compiled in Table 2.

(Film Forming Ability)

A black color painted car of a 1996 type (Nissan Cedric) was provided in a test and the entire body was washed with a car detergent on the market and thereafter, droplets of residual water were removed. Then, the entire automobile body was wiped out using a wet cloth to form a water repellent film on the entire body. It was investigated whether or not a uniform film was formed on the entire body. Evaluation was expressed with 4 levels comprising a uniform film was sufficiently formed [◎], an almost uniform was formed[○], a film with non-uniformity was formed [Δ] and a film was not formed over the entire car body [X].

(Dirt Removing Ability)

A test surface was prepared in such a manner that a black color painted car of a 1996 type (Nissan Cedric) was provided in a test, the bonnet of a car was applied with wax to remove a stain or dirt, a filmy portion of the wax left on the surface is removed with an aliphatic solvent and then the car was left outdoors for 2 weeks.

After the test surface was divided into 10 segments (one segment was about 30×60 square cm), 8 segments thereof were applied with a wet cloth to wipe away dirt and then, form a water repellent film. A removing ability was evaluated on dust and sand attaching to the car body surface with 4 levels comprising very good [◎], good [○], average [Δ] and bad [X].

(Water Repellency Giving Ability)

Treated surfaces obtained after the dirt removing ability were subjected to the following tests:

i) Water repellency immediately after the treatment

Water was poured on each test surface and shapes of water droplets and a degree of repellency acting on the water droplets were visually observed, wherein evaluation was conducted with 4 levels comprising a droplet with a well swollen spherical surface and a good water repellency [◎], a droplet with a deformed spherical surface, though a water repellency is observed [○], a slightly weak water repellency [Δ] and almost no water repellency [X].

i) Glossiness immediately after the treatment

Each test surface was visually judged to evaluate with 4 levels comprising very good [◎], good [○], average [Δ] and bad [X].

iii) Sustainability of water repellency

Sustainability of water repellency of each test surface was evaluated in such a manner that water washing was applied after one month was elapsed, then water was poured on each test surface to judge shapes of water droplets formed on each test surface and a degree of repellency acting on the water droplets through visual observation with 4 levels comprising a droplet with a well swollen spherical surface and a good water repellency [◎], a droplet with a deformed spherical surface, though a water repellency is observed [○], a slightly weak water repellency[Δ] and almost no water repellency [X].

Example 7

| components | compositions (wt %) |
|---|---|
| dimethylpolysiloxane solution of trimethyl siloxi silicate (VP-1038) | 2.5 |
| dimethylsilicone oil (KF96-10) | 1.0 |
| amino-modified dimethylsiloxane (KF-859) | 2.0 |
| polyoxyethylene stearylether (Emulgen 106) | 0.5 |
| water | 94.0 |
| Total | 100.0 |

After the surfactant was dissolved in water, the dimethylpolysiloxane solution of trimethyl siloxi silicate, the dimethylsilicone oil and the amino-modified dimethylsiloxane were added into the solution of the surfactant while stirring to form an emulsion as a wet cloth treatment agent. The wet cloth treating agent (20 g) was impregnated into a spun lace non-woven cloth cut in size of 30 cm×50 cm (a weight of about 12 g) with a fabric weight of 70 $g/m^2$ made using mixed-spun yarns from fibers of rayon and polyester (a weight mixing ratio of 20% of rayon and 80% of polyester) and thereafter, thus obtained wet cloth was packed in a pillow package with a laminated film composed of a polyethylene film and an aluminum foil.

Example 8

| components | compositions (wt %) |
|---|---|
| emulsion of a dimethylpolysiloxane solution of trimethyl siloxi silicate (R-2701) | 8.0 |
| dimethylsilicone oil emulsion (SH7036) | 2.0 |
| polyoxyethylene stearylether (Emulgen 106) | 0.1 |
| water | 89.9 |
| Total | 100.0 |

The emulsion of a dimethylpolysiloxane solution of trimethyl siloxi silicate, the dimethylsilicone oil emulsion and the surfactant were mixed and thereafter, water was added to the solution to obtain a wet cloth treating agent. The wet cloth treating agent (20 g) was impregnated into a spun lace non-woven cloth cut in size of 30 cm×50 cm (a weight of about 12 g) with a fabric weight of 70 $g/m^2$ made using mixed-spun yarns from fibers of cotton and polyester (a weight mixing ratio of 30% of cotton and 70% of polyester) and thereafter, thus obtained wet cloth was packed in a pillow package with a laminated film composed of a polyethylene film and an aluminum foil.

Example 9

| components | compositions (wt %) |
|---|---|
| emulsion of a dimethylpolysiloxane solution of trimethyl siloxi silicate (R-2701) | 5.0 |
| emulsion of a cyclic silicone solution of trimethyl siloxi silicate (X-52-1451) | 3.0 |
| emulsion of amino-modified dimethylsiloxane (POLON MF-14EC) | 2.0 |
| water | 90.0 |
| Total | 100.0 |

The two kinds of solution emulsions of trimethyl siloxi silicate and the emulsion of amino-modified dimethylsiloxane were mixed, thereafter, water was added into the solution and the solution was then stirred to obtain a wet cloth treatment agent. The wet cloth treating agent (20 g) was impregnated into a spun lace non-woven cloth cut in size of 30 cm×50 cm (a weight mixing ratio of 30% of pulp, 35% of polyethylene and 35% of polyester and a weight of about 12 g) with a fabric weight of 70 $g/m^2$, having a three layer structure comprising a central layer made of pulp and both outer layers made using mixed-spun yarns from ultra, super fine fibers of polyethylene and polyester and thereafter, thus obtained wet cloth was packed in a pillow package with a laminated film composed of a polyethylene film and an aluminum foil.

Example 10

| components | compositions (wt %) |
|---|---|
| paraffin wax emulsion (Emustar 0136) | 5.0 |
| dimethylsilicone oil emulsion (SH7036) | 5.0 |
| water | 90.0 |
| Total | 100.0 |

The paraffin wax emulsion and the dimethylsilicone oil emulsion were mixed and thereafter, water was added into the solution and the solution was stirred to obtain a wet cloth treatment agent. The wet cloth treating agent (20 g) was impregnated into a spun lace non-woven cloth cut in size of 30 cm×50 cm (a weight mixing ratio of 40% of pulp and 60% of polyester and a weight of about 12 g) with a fabric weight of 70 $g/m^2$, having a three layer structure comprising a central layer made of pulp and both outer layers made of polyester and thereafter, thus obtained wet cloth was packed in a pillow package with a laminated film composed of a polyethylene film and an aluminum foil.

Example 11

| components | compositions (wt %) |
|---|---|
| emulsion of perfluroalkylpolyether (Fomblin emulsion) | 10.0 |
| polyoxyethylene stearylether (Emulgen 106) | 0.1 |
| water | 89.9 |
| Total | 100.0 |

The emulsion of perfluoroalkylpolyether and the surfactant were mixed, thereafter, water was added into the solution and then the solution was stirred to obtain a wet cloth treatment agent. The wet cloth treating agent (20 g) was impregnated into a spun lace non-woven cloth cut in size of 30 cm×50 cm (a weight mixing ratio of 50% of pulp, 25% of polyethylene and 25% of polyester and a weight of about 12 g) with a fabric weight of 70 $g/m^2$, having a three layer structure comprising a central layer made of pulp and both outer layers made using mixed-spun yarns from ultra, super fine fibers of polyethylene and polyester (a weight mixing ratio of 50% of polyethylene and 50% of polyester), thereafter, thus obtained wet cloth was packed in a pillow package with a laminated film composed of a polyethylene film and an aluminum foil.

Example 12

The wet cloth treating agent (20 g) which was obtained in the example 8 was impregnated into a spun lace non-woven cloth cut in size of 30 cm×50 cm (a weight of about 12g) with a fabric weight of 70 $g/m^2$ made using mixed-spun yarns from ultra, super fine fibers of polyethylene and polyester (a weight mixing ratio of 50% of polyethylene and 50% of polyester) and thereafter, thus obtained wet cloth was packed in a pillow package with a laminated film composed of a polyethylene film and an aluminum foil.

Example 13

The wet cloth treating agent (20 g) which was obtained in the example 8 was impregnated into a spun lace non-woven cloth cut in size of 30 cm×50 cm (a weight mixing ratio of 70% of rayon and 30% of polyester and a weight of about 12 g) with a fabric weight of 70 g/$m^2$ made of rayon and polyester and thereafter, thus obtained wet cloth was packed in a pillow package with a laminated film composed of a polyethylene film and an aluminum foil.

Example 14

The wet cloth treating agent (20 g) which was obtained in the example 8 was impregnated into a spun lace non-woven cloth cut in size of 30 cm×50 cm (a weight of about 12 g) with a fabric weight of 70 g/$m^2$ made of rayon and thereafter, thus obtained wet cloth was packed in a pillow package with a laminated film composed of a polyethylene film and an aluminum foil.

(Test Results)

As can be seen from Tables 1 and 2, when a wet cloth of the present invention is used, a series of operations, such as a conventional car washing, swabbing water droplets, application of wax, drying and wiping a surface, can be replaced with such a simple operation as wiping the body of an automobile.

Especially by using a cloth which are made using mixed-spun yarns from hydrophilic fibers and lipophilic fibers in the ranges as shown in Table 2, a film was able to be formed all over an automobile body in a uniform manner. On the other hand, when lipophilic fibers only were used, too, a water repellent film was able to be formed, but a dirt removing ability was insufficient, the water repellent film formed was poor and further glossiness immediate after the treatment was not satisfactory either. As hydrophilic fibers were increased in ratio, non-uniformity was produced on a water repellent film and the film was not able to be formed all over the body.

Table 1

Table 2

According to the present invention, there are no such series of operations as a conventional car washing, swabbing water droplets, application of wax, drying and wiping a surface but instead, such a simple operation as wiping the body of an automobile is only required, with the result that such a simple operation is not at all inferior to a conventional care and cleaning in effect, but glossiness and water repellency of a treated surface can be rather excellent.

Further, when a cloth which is produced using mixed-spun yarns from hydrophilic fibers and lipophilic fibers in specific mixed ratio ranges, a uniform water repellent film can be formed all over the body of an automobile and therefore, more excellent effect can be exerted.

TABLE 1

| | Result of Evaluation Test | | | | |
|---|---|---|---|---|---|
| | A Time Required for Formation of a Water Repellent Film | Dirt Removing Ability | Water Repellency Immediately After The Treatment | Glossiness Immediately After The Treatment | Sustainability of Water Repellency |
| Example 1 | ⊚ | ⊚ | ⊚ | ⊚ | ⊚ |
| Example 2 | ⊚ | ⊚ | ⊚ | ⊚ | ○ |
| Example 3 | ⊚ | ○ | ⊚ | ⊚ | ⊚ |
| Example 4 | ⊚ | ⊚ | ⊚ | ○ | ⊚ |
| Example 5 | ⊚ | ⊚ | ⊚ | ⊚ | ⊚ |
| Example 6 | ⊚ | ⊚ | ⊚ | ⊚ | ⊚ |
| Comparative Example 1 | X | ○ | Δ | ⊚ | Δ |
| Comparative Example 2 | X | ⊚ | Δ | ○ | X |
| Comparative Example 3 | X | ○ | ⊚ | ○ | ⊚ |

TABLE 2

| | | | Result of Evaluation Test | | | | |
|---|---|---|---|---|---|---|---|
| | Structure of A Cloth | Mixing Ratio of Lipophilic Fibers and Hydrophilic Fibers | Film Forming Ability | Dirt Removing Ability | Water Repellency Immediately After The Treatment | Glossiness Immediately After The Treatment | Sustainability of Water Repellency |
| Example 7 | mono layer non-woven | 80/20 | ○ | ○ | ⊚ | ○ | ⊚ |
| Example 8 | mono layer non-woven | 70/30 | ○ | ○ | ⊚ | ○ | ⊚ |
| Example 9 | three layer non-woven | 70/30 | ⊚ | ⊚ | ⊚ | ⊚ | ○ |
| Example 10 | three layer non-woven | 60/40 | ⊚ | ⊚ | ⊚ | ⊚ | ○ |
| Example 11 | three layer non-woven | 50/50 | ⊚ | ⊚ | ⊚ | ⊚ | ⊚ |
| Example 12 | mono layer non-woven | 100/0 | ○ | Δ | ○ | Δ | Δ |
| Example 13 | mono layer non-woven | 30/70 | Δ | Δ | ○ | X | Δ |

TABLE 2-continued

| | Structure of A Cloth | Mixing Ratio of Lipophilic Fibers and Hydrophilic Fibers | Result of Evaluation Test: Film Forming Ability | Dirt Removing Ability | Water Repellency Immediately After The Treatment | Glossiness Immediately After The Treatment | Sustainability of Water Repellency |
|---|---|---|---|---|---|---|---|
| Example 14 | mono layer non-woven | 0/100 | X | Δ | ○ | X | Δ |

What is claimed is:

1. A wet cloth for cleaning, applying a water repellant finish and polishing of an automobile paint film, which is obtained by impregnating a cloth with a wet cloth treating agent prepared by dispersing a first silicone compound consisting of trimethyl siloxy silicate expressed in the following general formula (1):

$$[(CH_3)_3SiO_{1/2}]_X\cdot[SiO_2]_Y \quad (1)$$

where X=1 to 3 and Y=0.5 to 8 and a second silicone compound in water using an emulsifier.

2. A wet cloth for cleaning, applying a repellant and polishing of an automobile paint film according to claim 1, wherein the second silicone compound is at least one selected from dimethyl polysiloxane and modified dimethyl polysiloxane, which are non-volatile oil agents.

3. A wet cloth for cleaning, applying a water repellant finish and polishing of an automobile paint film according to claim 1, wherein the emulsifier is a surfactant.

4. A wet cloth for cleaning, applying a water repellant finish and polishing of an automobile paint film according to claim 1, wherein the cloth is a non-woven cloth.

5. A wet cloth for cleaning, applying a water repellant finish and polishing of an automobile paint film according to claim 1, wherein the cloth contains lipophilic fibers and hydrophilic fibers in ratio of content ranged from 80:20 to 50:50 by weight.

6. A wet cloth for cleaning, applying a water repellant finish and polishing of an automobile paint film according to claim 1, wherein the cloth has a three layer structure which is obtained by arranging lipophilic fiber layers made of lipophilic fibers on both sides of a hydrophilic fiber layer made of hydrophilic fibers.

7. A wet cloth for cleaning, applying a water repellant finish and polishing of an automobile paint film according to claim 1, wherein the cloth is made using yarns spun from natural fibers and synthetic fibers singly or in mixture.

8. A wet cloth for cleaning, applying a water repellant finish and polishing of an automobile paint film according to claim 1, wherein the cloth is made by yarns spun from ultra, super fine fibers of less than 0.3 denier each.

9. A wet cloth for cleaning, applying a water repellant finish and polishing of an automobile paint film according to claim 1, which is prepared by impregnating the cloth with the wet cloth treating agent in a ratio of 1.5 to 3.1 times a weight of the cloth.

10. A wet cloth for cleaning, applying a water repellant finish and polishing of an automobile paint film according to claim 2, wherein the emulsifier is a surfactant.

11. A wet cloth for cleaning, applying a water repellant finish and polishing of an automobile paint film according to claim 2, wherein the cloth is a non-woven cloth.

12. A wet cloth for cleaning, applying a water repellant finish and polishing of an automobile paint film according to claim 2, wherein the cloth contains lipophilic fibers and hydrophilic fibers in ratio of content ranged from 80:20 to 50:50 by weight.

13. A wet cloth for cleaning, applying a water repellant finish and polishing of an automobile paint film according to claim 2, wherein the cloth has a three layer structure which is obtained by arranging lipophilic fiber layers made of lipophilic fibers on both sides of a hydrophilic fiber layer made of hydrophilic fibers.

14. A wet cloth for cleaning, applying a water repellant finish and polishing of an automobile paint film according to claim 2, wherein the cloth is made using yarns spun from natural fibers and synthetic fibers singly or in mixture.

15. A wet cloth for cleaning, applying a water repellant finish and polishing of an automobile paint film according to claim 2, wherein the cloth is made by yarns spun from ultra, super fine fibers of less than 0.3 denier each.

16. A wet cloth for cleaning, applying a water repellant finish and polishing of an automobile paint film according to claim 2, which is prepared by impregnating the cloth with the wet cloth treating agent in a ratio of 1.5 to 3.1 times a weight of the cloth.

* * * * *